Patented June 6, 1950

2,510,877

UNITED STATES PATENT OFFICE 2,510,877

RESOLUTION OF NITROGEN BASE MIXTURES

Karl H. Engel, Teaneck, N. J., assignor to Allied Chemical & Dye Corporation, New York, N. Y., a corporation of New York No Drawing. Application March 3, 1947, Serial No. 732,139

6 Claims. (Cl. 260—286)

This invention relates to the separation of isoquinoline from mixtures thereof with other nitrogen bases.

Pyridine, quinoline, isoquinoline and their homologs are customarily extracted along with other nitrogen bases from coke oven distillates and other sources of heterocyclic nitrogen bases by means of an aqueous solution of a mineral acid, usually sulfuric acid. After liberation from these acid solutions by means of alkali, the base mixtures thus obtained are customarily fractionally distilled to obtain fractions predominating in a particular base. Isoquinoline fractions may thus be obtained, and fractions are generally taken which boil predominantly within the range of 241°–245° C. However, these fractions may vary in isoquinoline content from a few percent to about 75%, the remainder consisting of other nitrogen bases of boiling range close to isoquinoline and not readily separable therefrom by distillation, e. g., quinoline, quinaldine, alkyl pyridines such as tetramethyl pyridines and primary aromatic amines such as cumidines. Mixtures of this kind have found limited practical application and are of relatively low economic value. Pure isoquinoline, however, is a product of considerable commercial interest, being useful for example in the preparation of pharmaceutical products and dyes. The purity requirements in these fields are rigid.

As above indicated, the bases present with isoquinoline in its commercial fractions are not readily separable from the isoquinoline by fractional distillation. No description of a practical method for separating these closely related compounds has been found in the literature in this field. In the case of various base mixtures, methods usually depending upon fractional crystallization of the more common salts of the bases present, e. g., sulfates, chlorates, etc., have been proposed. However, as above stated, for the separation of reasonably pure isoquinoline from such closely related nitrogen bases as quinoline, quinaldine, close-boiling pyridine homologs, and close-boiling aromatic amines no known methods have heretofore been practical.

It is an object of this invention to provide a process for separating pure isoquinoline from mixtures thereof with closely related nitrogen bases not readily separable therefrom by distillation.

It is a further object of this invention to provide a commercially feasible process for isolating pure isoquinoline or fractions enriched in isoquinoline from the usual commercial isoquinoline fractions, particularly from tar-base fractions boiling predominantly within the range of about 241° to 245° C.

I have discovered that isoquinoline may be preferentially precipitated as its hydrochloride from mixtures thereof of the character described with quinoline, quinaldine and other like-boiling nitrogen bases not readily separable from isoquinoline by distillation, by treating such a base mixture in a substantially anhydrous medium with a limited amount of hydrogen chloride or equivalent reagent for the formation of base hydrochloride.

Such preferential precipitation of isoquinoline hydrochloride to the substantial exclusion of other base hydrochlorides sets isoquinoline apart from such closely related bases as quinoline, which is not precipitated in its form of its hydrochloride even from fractions containing it in greatly predominating amount. Reasons for the preferential precipitation of isoquinoline hydrochloride are not fully understood but appear to depend on phase rule relations which are unpredictable and which in this case are complex because of the number of the substances involved. The relative basicity of the bases is not a factor when operating in accordance with my invention as indicated by the fact that the precipitate does not contain the various bases of the original base mixture in amounts which would be expected from the well-known distribution laws.

A suitable isoquinoline crude for use in the process of my invention may advantageously be obtained by fractional distillation of isoquinoline containing base mixtures recovered from the usual source of such mixtures, for example, coal tar. It has been found that isoquinoline-containing base mixtures boiling for the most part within the range 241° to 245° C. have suitable properties for precipitation of isoquinoline in the form of its hydrochloride in accordance with my invention. The isoquinoline fractions of this type generally obtainable usually contain from about 50% to 75% isoquinoline and an amount of quinaldine less than about one-half the weight percent of the isoquinoline, the remainder of the fraction consisting of quinoline, methyl quinolines, methyl isoquinolines and other nitrogen bases of like-boiling point.

In a preferred method of carrying out the process of my invention, a commercial isoquinoline fraction containing from 50% to about 75% isoquinoline is treated either with gaseous hydrogen chloride or with aqueous hydrochloric acid which may advantageously be the inexpensive and readily available technical grade of muriatic acid. This treatment is preferably carried out in the presence of an inexpensive hydrocarbon solvent such as benzene, toluene, a xylene, or a petroleum solvent. An amount of hydrogen chloride or hydrochloric acid sufficient to react with slightly less than the total amount of isoquinoline present is preferably employed. For example, in treating a 75% isoquinoline fraction I have found it advantageous to add sufficient hydrogen chloride (which term is used herein to include both gaseous hydrogen chloride and hydrochloric acid) to precipitate about 85% of the isoquinoline present. However, smaller or greater amounts of acid may be employed, if desired. With smaller amounts of acid, a lower yield of pure isoquinoline is obtained, while with larger amounts of acid, a base mixture enriched in isoquinoline, rather than the pure base, is the product. The reaction between base and hydrogen chloride may be carried out at whatever tempeature is convenient, e. g., at the normally prevailing temperature.

I have found it desirable to crystallize the isoquinoline hydrochloride in the substantial absence of water, and preferably in the absence of substantial amounts of the lower alcohols, ketones and similar polar compounds. In order to obtain an anhydrous crystallization medium when an aqueous hydrochloric acid is employed, the mixture is heated to refluxing temperature, preferably with a diluent such as toluene present, to remove the water by azeotropic distillation. The distillate is condensed in a side arm trap where it separates into a water layer and an oil layer. The water layer is removed while the oil layer, containing unreacted base and diluent, where such has been used, is continuously returned to the still. When all, or nearly all, of the water has thus been removed, the still charge is cooled to normally prevailing temperatures to bring about or to complete crystallization of isoquinoline hydrochloride.

The precipitated crystals are then isolated by filtration, e. g., centrifuging, and are freed from adhering unreacted bases by washing with a suitable solvent, e. g., the solvent used as diluent for the precipitation. The crystals are freed from adhering solvent by drying or other means. Isoquinoline is liberated from the crystals thus obtained, for example by adding an equivalent weight of alkali to an aqueous solution of the isoquinoline hydrochloride. The liberated base which separates out from the resulting salt solution is dehydrated (for example, by treating with solid caustic soda) and distilled.

The mother and wash liquors may be distilled to recover solvent for reuse in the process and the residual tar bases may then be refractionated to produce fractions rich in other bases, e. g., quinoline, quinaldine, etc.

A fair estimation of the isoquinoline content of a given crude may be obtained from its freezing point, or, better, from the limpid point of the base mixture, which is the temperature at which a suspended solid phase will just disappear. Given a series of isoquinoline crudes, a relation may be readily worked out, by simple experimentation, between the optimum amount of hydrogen chloride to be used for precipitation of pure isoquinoline hydrochloride, and the limpid point of the various isoquinoline crudes to be dealt with.

As above indicated, by the use of suitable diluents, it is possible to handle the isoquinoline hydrochloride precipitate even though the isoquinoline is present in realtively high concentration in the crude. It may also be advantageous to carry out a step-wise precipitation of isoquinoline hydrochloride, particularly when the isoquinoline content of the crude is high. In that case, a convenient proportion of the isoquinoline is precipitated as hydrochloride and filtered in one or more preliminary steps. The mother liquor is then subjected to a further treatment with a quantity of hydrogen chloride sufficient to obtain in this step the optimum yield of pure product. This procedure is illustrated in Example 1.

The following examples are illustrative of the process of my invention:

Example 1.—A mixture of heterocyclic bases, boiling range 242°–244° C., limpid point 17° C., and specific gravity 1.098 at 15.5° C., was used as the source of isoquinoline.

The apparatus used consisted of an acid-resistant reaction vessel with agitator, a jacket suitable for heating with steam or for cooling with circulating tap water, and a reflux condenser. Distillation condensate was not immediately returned to the vessel, but passed through a settling trap which permitted a separation of mixed distillates consisting of aqueous and oily layers of liquid. Liquids could be withdrawn from the trap or returned to the reaction vessel as desired.

The vessel was charged with 500 parts by weight of the crude isoquinoline fraction diluted with 600 parts by weight of a hydrocarbon solvent of petroleum origin having a boiling range of 150°–190° C. The charge was partly neutralized by gradual addition of 250 parts by weight of 35% hydrochloric acid. The mixture was heated to refluxing. Condensate was allowed to separate into two layers, the upper oily layer being continuously returned to the still. The lower water layer was removed until the still charge was practically dehydrated. The temperature of the charge during dehydration rose from 145° C. initially to 175° C. at the end. Crystallization of isoquinoline hydrochloride began near the end of the dehydration and was completed by cooling the charge to about 25° C. The heavy crystal slurry was centrifuged; crystals were liberally washed with hydrocarbon solvent to free them from adhering undesired bases. The yield of crystals, on a solvent-free basis, was 416 parts by weight; their melting point was 191° C., corrected.

Solvent-containing crystals were dissolved in 600 parts of water. The hydrocarbon solvent settled as an upper layer and was separated. The aqueous solution was partly evaporated to remove last traces of solvent. The solution was cooled and isoquinoline was liberated by addition of 110 parts by weight of sodium hydroxide in 300 parts of water. Isoquinoline settled as an upper oily layer and was separated from the aqueous salt solution. It was dehydrated by being agitated with dry sodium hydroxide, and distilled, 290 parts by weight or 58% of the original mixture of bases being obtained. The finished material was nearly colorless; it possessed high color stability toward light and air. Its crystallizing point was 25.5° C., indicating a purity of about 99%.

By-product bases contained in hydrocarbon solvent used in crystallization and washing operations may be reclaimed by extracting the hydrocarbon solutions with aqueous mineral acid. Extracted bases are again liberated by neutralization of their mineral acid solutions.

In a similar procedure in which a smaller proportion of hydrogen chloride was applied to the crude mixture of bases, isoquinoline hydrochloride having a melting point of 196° C., corrected, was obtained. Isoquinoline liberated from this material had a crystallizing point of 26.0° C., higher than any previously recorded value. Its boiling point at 760 mm. was 242.9° C., corrected. Its specific gravity, as a supercooled liquid, was 1.0981 at 25°/4° C. The refractive index of the same material $n_D$ at 25° C. was 1.6004.

*Example 2.*—In an operation similar to that described in the preceding example, a mixture of bases of coal tar origin was used having the following characteristics: its specific gravity at 15.5° C. was 1.092, its limpid point 0.3° C. The boiling range of the fraction was 241.5° to 244° C.

1000 parts by weight of this material, 170 parts by weight of toluene and 192 parts by weight of 35% hydrochloric acid, were charged into the apparatus described in the preceding example. The charge was heated to refluxing and entrained water gradually removed until dehydration of the charge was practically complete, 125 parts by weight of water being taken off. The temperature of the charge rose from about 100° C. to 138° C. at the completion of the dehydration. The charge was cooled to induce crystallization of isoquinoline hydrochloride. A uniformly granular precipitate of light colored crystals separated out. Crystals were centrifuged, washed with fresh toluene, and freed from toluene by drying at about 90° C., 275 parts by weight of isoquinoline hydrochloride being obtained, corresponding to 208 parts by weight of free isoquinoline. The melting point of this material was 192°-193° C. Crystals were dissolved in 300 parts by weight of water, and isoquinoline was liberated by addition of 90 parts by weight of sodium hydroxide dissolved in about 200 parts by weight of water. The carefully dried and distilled isoquinoline had a crsytallizing point of 25.5° C., indicating a purity of about 99%.

By-product bases were separated from dissolved hydrogen chloride and from toluene as described in Example 1.

Since certain changes may be made in carrying out the above process without departing from the scope of the invention, it is intended that all matter contained in the above description shall be interpreted as illustrative and not in a limiting sense.

This application is a continuation-in-part of application Serial No. 463,412, filed October 26, 1942, now abandoned.

I claim:

1. A process for separating isoquinoline from a mixture of coal tar origin boiling substantially entirely within the range between 241.5° C. and 244° C., and having limpid points between 0.3° C. and 17° C., and specific gravities between 1.092 and 1.098 at 15.5° C. containing this base and other like-boiling nitrogen bases, comprising reacting said mixture with an amount of hydrogen chloride insufficient to react with all the isoquinoline present in the tar base mixture being treated and forming a substantially anhydrous reaction mixture, whereby isoquinoline is precipitated in the form of its hydrochloride, and separating the precipitated hydrochloride.

2. A process for separating isoquinoline from a mixture of coal tar origin boiling substantially entirely within the range between 241.5° C. and 244° C., and having limpid points between 0.3° C. and 17° C., and specific gravities between 1.092 and 1.098 at 15.5° C. containing this base and other like-boiling nitrogen bases, comprising treating said mixture in a substantially anhydrous medium with an amount of gaseous hydrogen chloride sufficient to react with the major part but not all of the isoquinoline to precipitate isoquinoline in the form of its hydrochloride, and separating the precipitated hydrochloride.

3. A process for separating isoquinoline from a mixture of coal tar origin boiling substantially entirely within the range between 241.5° C. and 244° C., and having limpid points between 0.3° C. and 17° C., and specific gravities between 1.092 and 1.098 at 15.5° C. containing this base and other like-boiling nitrogen bases, comprising treating said mixture with an amount of hydrochloric acid sufficient to react with the major part but not all of the isoquinoline, refluxing the resulting mixture, as the refluxing is continued removing water which separates out from the reflux condensate until substantially all the water has been removed from the reaction mixture, cooling the resulting mixture, whereby isoquinoline hydrochloride precipitates, and separating the precipitate.

4. A process for separating isoquinoline from a mixture of coal tar origin boiling substantially entirely within the range between 242° C. and 244° C., and having a limpid point of about 17° C. containing about 75% by weight thereof and other like-boiling nitrogen bases, comprising treating said mixture in a substantially anhydrous medium with an amount of gaseous hydrogen chloride sufficient to react with the major part but not all of the isoquinoline to precipitate isoquinoline in the form of its hydrochloride, and separating the precipitated hydrochloride.

5. A process for separating isoquinoline from a mixture of coal tar origin boiling substantially entirely within the range between 242° C. and 244° C., and having a limpid point of about 17° C. containing about 75% by weight thereof and other like-boiling nitrogen bases, comprising treating said mixture with an amount of hydrochloric acid sufficient to react with the major part but not all of the isoquinoline, refluxing the resulting mixture, as the refluxing is continued removing water which separates out from the reflux condensate until substantially all the water has been removed from the reaction mixture, cooling the resulting mixture, whereby isoquinoline hydrochloride precipitates, and separating the precipitate.

6. A process for separating isoquinoline from a mixture of nitrogen bases of coal tar origin boiling within the range between 242° C. and 244° C., and having a limpid point of about 17° C. and containing about 75% of isoquinoline, along with other like-boiling nitrogen bases, which comprises reacting said mixture in a substantially anhydrous medium with an amount of hydrogen chloride sufficient to react with about 85% of the isoquinoline, whereby substantially pure isoquinoline is precipitated in the form of its hydrochloride, and separating the precipitated hydrochloride.

KARL H. ENGEL.

REFERENCES CITED

The following references are of record in the file of this patent:

UNITED STATES PATENTS

| Number | Name | Date |
| --- | --- | --- |
| 1,965,828 | Fox | July 10, 1934 |
| 2,035,583 | Bailey | Mar. 31, 1936 |
| 2,288,281 | Huijser et al | June 30, 1942 |
| 2,391,270 | Reimers | Dec. 18, 1945 |
| 2,432,065 | Cislak et al. | Dec. 2, 1947 |

FOREIGN PATENTS

| Number | Country | Date |
| --- | --- | --- |
| 593,670 | Germany | Mar. 1, 1934 |